Jan. 24, 1961  J. MARTIN  2,969,209
FIRING MECHANISMS SUITABLE FOR AIRCRAFT
SEAT EJECTION DEVICES
Filed July 30, 1958  2 Sheets-Sheet 2
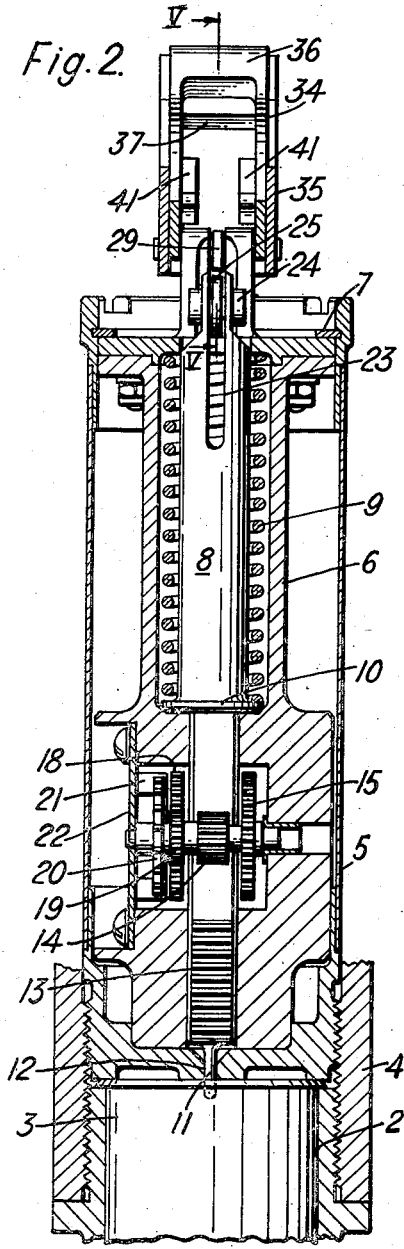
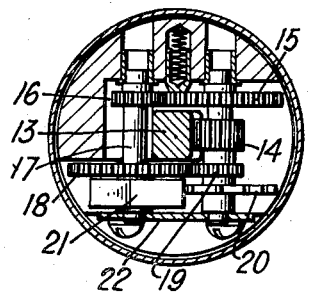
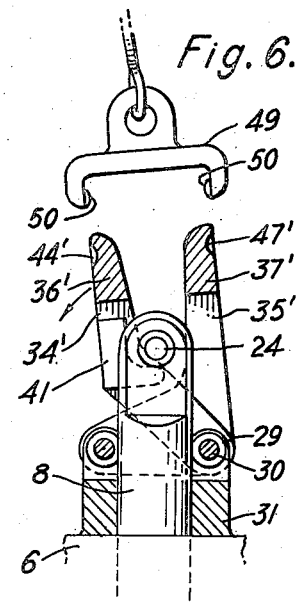

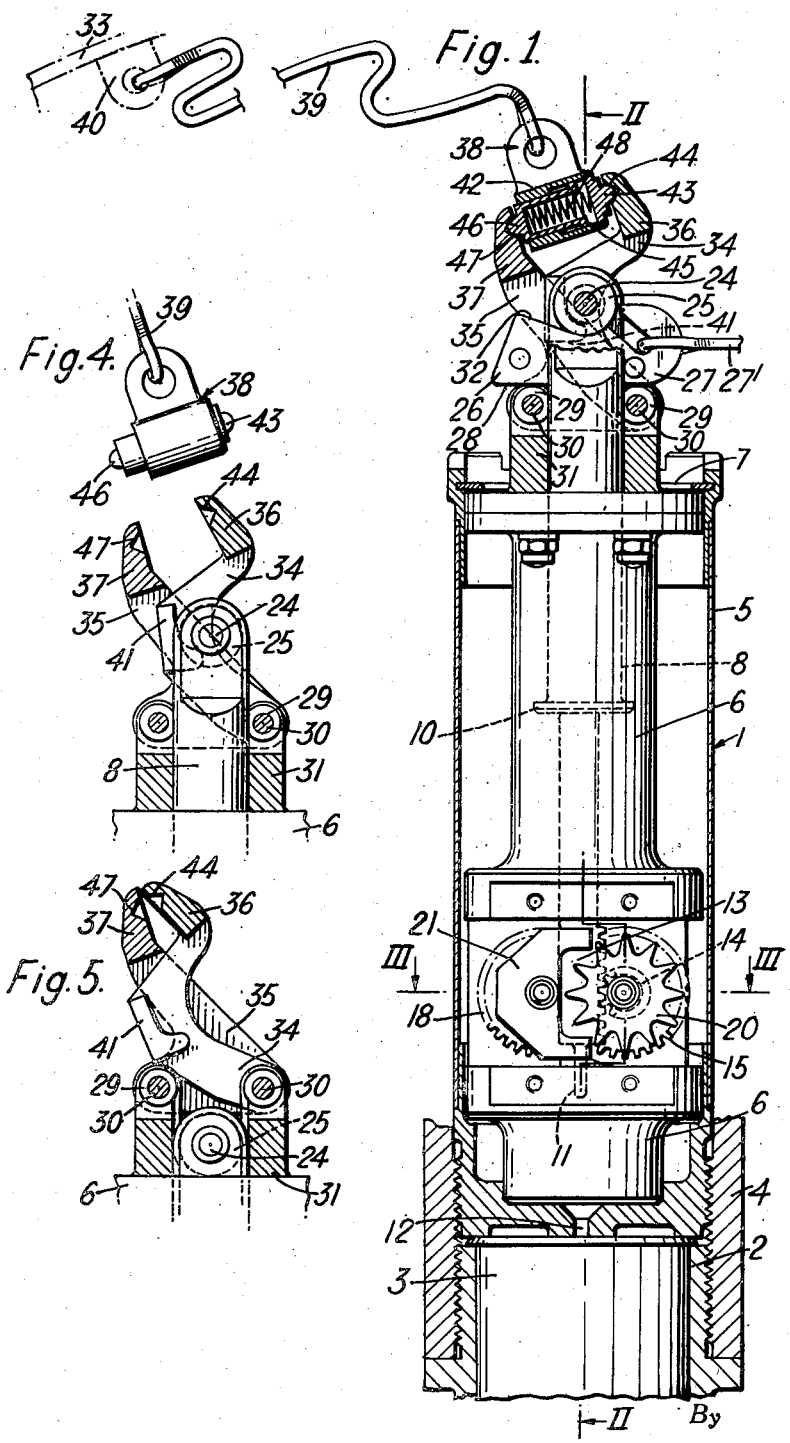

United States Patent Office 2,969,209
Patented Jan. 24, 1961

2,969,209

FIRING MECHANISMS SUITABLE FOR AIRCRAFT SEAT EJECTION DEVICES

James Martin, Southlands Manor, Southlands Road, Denham, near Uxbridge, England

Filed July 30, 1958, Ser. No. 752,132

Claims priority, application Great Britain Aug. 2, 1957

10 Claims. (Cl. 244—122)

This invention relates to firing mechanism suitable for aircraft seat ejection devices of the kind comprising an ejection gun adapted for launching a seat from an aircraft upon the uncovering of an ejection opening in the aircraft, such ejection opening usually being in the upper part of an aircraft cockpit or fuselage and covered by a canopy although the opening could be in the lower part of the aircraft fuselage where downward seat ejection is envisaged, the ejection opening then being closed normally by a jettisonable or openable cover. Hereinafter the terms "cockpit canopy" or canopy will, except where the text otherwise implies, be used generically to cover both of the above arrangements.

In aircraft ejection devices of the aforesaid character the ejection gun is usually of the type which comprises relatively slidable or telescopically arranged colinear parts, one part adapted to be anchored to the aircraft and a further part adapted to carry the ejection seat from the aircraft when the gun is fired, a breech chamber for receiving a cartridge for generating gas pressure to cause relative seat ejecting movement between the said relatively slidable gun parts, and firing mechanism for firing said cartridge when it is desired to eject the ejection seat from the aircraft.

Before the airman or other occupant (hereinafter referred to as "airman") can be safely ejected from an aircraft it is first necessary to form an ejection opening in the fuselage of the aircraft sufficiently large to permit the passage therethrough of the ejection seat and its occupant. In some cases the ejection opening is formed by opening hinged canopy sections and with this arrangement it is, in some instances, necessary to effect the opening of a hinged cockpit canopy beyond a normal open position in which the occupant is afforded normal access to and from the aircraft, to an emergency open position in which the opening provided is large enough for the passage therethrough of the ejection seat and its occupant. In other cases the ejection opening is created by entirely jettisoning the cockpit canopy prior to ejection of the seat and its occupant.

In any case it is very desirable that it should be possible to effect canopy opening to the emergency position or to complete canopy jettisoning without it being necessary that the ejection seat should be subsequently launched. Moreover it is desirable that it should be immaterial in the case of an emergency in what order the airman takes action to form the ejection opening and to eject the seat, the only important item being that the seat should not be ejected before the ejection opening is formed.

Thus the invention is concerned with a firing mechanism for firing an ejection seat gun of the type above described, such firing mechanism being of the kind comprising a firing pin actuated by a firing plunger slidably mounted in a housing or breech block and biassed in a firing direction by means of a powerful spring, and dual restraining means for preventing the said plunger from moving from its normal or cocked position under the action of the said biassing spring until the restraint exercised by both of said restraining means on the plunger has been removed, the removal of such restraints being achieved one by the uncovering of the ejection opening in the aircraft to the extent necessary to permit of seat ejection, and the other by means under the control of the airman requiring to be ejected from his aircraft. More particularly the invention concerns improvements in or modifications of the firing mechanism disclosed in my copending patent application Ser. No. 662,883, filed May 31, 1957, wherein the dual firing pin restraining means comprise an airman controlled sear which, in its restraining position, engages the said firing plunger and abutment means on the firing plunger housing or on a part rigidly associated in use with such housing, and a pivotable arm carrying a retaining cam which, when in its normal or plunger restraining position, engages an abutment on the firing plunger and serves as the second restraint on the latter, and means whereby the said pivotal lever and its cam are held in their firing plunger restraining position until such time as the appropriate ejection opening has been formed in the aircraft, e.g. by appropriately opening or jettisoning the cockpit canopy.

The means for holding the said retaining cam in its firing plunger restraining position that are disclosed in the said co-pending application Ser. No. 662,883 comprise a spring urged plunger carried by the canopy of the cockpit and which, when the canopy is closed, holds the said cam provided arm in its firing plunger restraining position but which, when the canopy is jettisoned, immediately releases the arm for lateral displacement by the firing plunger when this is freed from the restraint of said sear.

According to this invention there is provided a firing mechanism of the kind described and suitable for use with aircraft seat ejection devices, wherein the dual restraining means for the firing plunger are separately operable in any order and comprise a first retaining member normally engaging the or a part on said plunger to prevent movement of the plunger from its normal or cocked position to its firing position but adapted to be disengaged from the plunger on the airman taking seat ejecting action; a second retaining member also adapted normally to engage a part on said firing plunger to retain the plunger in its said normal cocked position, such second retaining member being carried by a member displaceable relatively to the said housing and to said firing plunger from a plunger-restraining position to a plunger releasing position, said displaceable member being itself carried by the plunger housing or a part fixed in relation thereto; and holding means for simultaneously engaging said displaceable member and a part of or fixed in relation to said housing to hold the said displaceable member and its said second plunger retaining member in their plunger restraining positions, said holding means being coupled or adapted for coupling to the aircraft cockpit canopy so that, when such canopy is opened or jettisoned appropriately to permit of seat ejection, the holding means is operated to release the displaceable member and thereby to permit it, and the second retaining member carried thereby, to move into plunger releasing positions.

In order that the nature of the invention may be more readily understood and carried into practice and further features of the invention appreciated, two embodiments of the same will now be described, by way of example, with reference to the accompanying drawings, in which:

Figure 1 is a part vertical sectional and part side elevation of a firing mechanism constructed in accordance with this invention and for use in connection with an ejection gun of an aircraft ejection seat, the firing plunger being shown in a normal or cocked position;

Figure 2 is a longitudinal section on line II—II Figure 1 but showing the firing plunger after making its firing movement;

Figure 3 is a section on the line III—III Figure 1;

Figure 4 is a section similar to the section shown on the upper part of Figure 1 but illustrating a different position of the mechanism shown in that Figure;

Figure 5 is a section on the line V—V Figure 2; and

Figure 6 is a sectional view similar to Figure 4 but showing an alternative form of construction.

The firing mechanism illustrated in the drawing is particularly intended for use with the telescopic ejection gun of a Martin-Baker type of ejection seat of the general form described in Patents Nos. 2,467,763, 2,806,664, and 2,808,217 and particularly where means are in an aircraft provided for forcibly entirely jettisoning an aircraft canopy hood, for example as described in patent application Ser. No. 501,685, filed April 15, 1955, now U.S. Patent No. 2,937,829: the invention may however be applied to other makes of ejection seat and to aircraft having hinged canopies.

The invention is, as hereinbefore explained, particularly concerned with an improvement in or modification of the invention described in the co-pending application Ser. No. 662,883, the firing mechanism being included in a unit 1 adapted to be fixed in coaxial relationship with a breech chamber 2 for containing an explosive cartridge 3 serving, when detonated, to generate gas pressure, for ejecting or initiating the ejection of an aircraft ejection seat. The breech chamber 2 is provided in the upper part or breech of the inner cylinder or piston 4 of the telescopic ejection gun, the latter being adapted to be located centrally between the upstanding side members of an ejection seat and the said inner cylinder of the gun being adapted, when the gun is fired, to lift the ejection seat from the aircraft whilst an outer cylinder (not shown) of the gun remains attached to the aircraft.

The firing unit includes an outer cylindrical casing 5 in which is mounted a firing plunger housing or breech block 6 which is bodily removable from the casing 5 on withdrawing a spring retaining ring 7 from the upper end of the casing. The housing 6 is substantially of the same form as described in my said co-pending application Ser. No. 662,883 and includes a firing plunger 8 coaxially movable relatively to the housing and biased towards the breech chamber 3 by a powerful compression spring 9 operating between an annular shoulder 10 on the firing plunger 8 and an internal shoulder near the upper end of the housing (see Figure 2).

At its lower part the firing plunger 8 carries a firing pin 11 adapted to pass through a hole 12 in the bottom of the casing 5 of the firing unit 1 and to detonate the cartridge 3. Between the shoulder 10 and the firing pin 11 the firing plunger 8 is provided with a toothed rack 13 which, when the plunger 8 is in its normal or cocked position (shown in Figure 1), is in mesh with a spur pinion 14 which is rigidly and coaxially fixed to a spur wheel 15 meshing with a further spur pinion 16 fixed on a shaft 17 also having fixed thereon a spur wheel 18 engaging with a spur pinion 19 freely rotatable independently of the spur pinion 14 and coaxially fixed to a star wheel 20 cooperating with a rockable U-shaped escapement element 21, this escapement mechanism being clearly shown in Figures 1, 2 and 3, a cover plate 22 (shown in Figures 2 and 3) being removed on Figure 1 for the sake of clarity in illustration.

When the firing plunger 8 is completely released for operation by the spring 9, the time delay mechanism initially retards the firing movement of the firing plunger and provides a delay in the operation of the firing pin, but although the invention is illustrated in conjunction with such a time delay mechanism it should be understood that it may be applied also to firing units where no such time delay mechanism is employed and where other means, such as slack in the cable hereinafter referred to, affords all the necessary time delay.

The firing plunger 8 projects upwardly through and beyond the top of the housing 6 and is furnished with a diametrical longitudinal slot 23 (see Figure 2) at the upper end of which is a transverse spindle 24 carrying a roller 25 located in the slot 23, this roller being engaged on its underside by the upper edge of the first retaining member which is in the form of a withdrawable sear 26 (Figure 1) of wedge shape in side elevation and having a hook like formation 27 at one end for connection to an eye on the end of a line 27' operable by the airman using the ejection seat in which the firing unit is mounted, such operation preferably being performed through the medium of a face screen or blind (not shown) which is adapted to be drawn down over the airman's face when ejection is desired, as described, for example, in the said Patent No. 2,467,763.

The lower edge 28 of the sear 26 bears on a first part fixed relatively to the housing, i.e. the top of the plunger housing and preferably upon rollers 29 mounted on cross spindles 30 mounted in vertical slots provided in a boss 31 at the top of the housing 6, these rollers providing for a free movement of the sear 26 during its withdrawal from the firing plunger 8. The upper edge 32 of the sear bears on the underside of the roller 25 and, as the sear is withdrawn, first raises the firing plunger 8 a little further to compress the spring 9, the plunger being relieved of restraint of the sear 26 immediately the latter is withdrawn from the plunger. Safety pins, not shown, may be provided for insertion through the sear during ground inspection of the ejection seat.

In Figure 1 of the drawings a completely jettisonable aircraft canopy 33 is diagrammatically illustrated in broken lines and in order that the firing plunger 8 may not operate to detonate the cartridge 3 before the canopy 33 has well cleared the cockpit, even if the sear 26 has been withdrawn from the firing plunger, further restraining means are provided for co-operation with the firing plunger 8. These further restraining means comprise a laterally displaceable member in the form of an inverted U-shaped (as seen in Figure 2) arm or strut 34 comprising a pair of side legs pivoted at their lower ends on a second part fixed relatively to the housing, viz. upon one of the spindles 30 carrying the rollers 29, the arm or strut 34 being of approximately S-shape in side view as seen in Figures 1, 4 and 5 and having its upper part crossing, scissor-wise, the oblique side legs of a third part fixed relatively to the housing, viz. a fixed inverted U-shaped member 35 of which the parallel dependent legs are fixed at their lower ends upon the two spindles 30, 30. The arm or strut 34 is free to swing between the legs of the member 35.

The pair of relatively laterally displaceable inverted U-shaped members 34 and 35 straddle the projecting upper end portion of the cocked firing plunger and the transoms or cross bars 36 and 37 of the members 34 and 35 are normally spaced apart by withdrawable holding means which, in the embodiment shown in Figures 1, 2, 4 and 5, is in the form of a distance piece 38 adapted to be located between the transoms as indicated in Figure 1 but which distance piece is arranged for withdrawal by means of a cable 39 attached at one end to the member 38 and at the other end to a lug 40 on the canopy 33, sufficient slack being preferably left in the cable 39 to ensure that the canopy 33 will move well clear of the cockpit before the distance piece 38 is withdrawn from between the transoms 36 and 37.

The arm or strut 34 is furnished on the inside of each of its two side legs with a second retaining member in the from of an L-shaped cam-like projection or element 41 which is adapted, when the distance piece 38 is in position between the transoms 36 and 37 and when the firing plunger 8 is in the normal or cocked position shown in Figure 1, to engage around and partially below the ends of the laterally projecting spindle 24 (or rollers on the ends of the latter) to support or retain the firing plunger 8 in the said cocked position even though the sear 26 may have been withdrawn from the firing plunger. It will be seen, however, that immediately the canopy 33 has been jettisoned and the cable 39 placed under adequate tension, the distance piece 38 will be withdrawn from between the transoms 36 and 37 of the arms or struts 34 and 35 so that the arm or strut 34 will (as soon as the sear 26 is withdrawn or if it has already been withdrawn) automatically be swung by the action of the spindle 24 of the firing plunger 8 on the cam-like projections 41, from the position shown in Figure 1 towards the transom of the arm or strut 35 and into the position shown in Figure 5, thus freeing the plunger 8 for firing movement. If the sear 26 has not been withdrawn when the distance piece 38 is removed from between the transoms 36 and 37, the arm or strut 34 will be swung clear of the spindle 24 of the firing plunger as above described, immediately the sear 26 is withdrawn.

Although the arms or struts 34 and 35 are preferably carried by the firing plunger housing 6, they could be carried on any suitable part which is, in use, in fixed relation to such housing, for example on said casing 5.

It will be appreciated that the sear 26 and the distance piece 38 can be withdrawn in any order and that they are quite independent of one another. Thus the canopy 33 can be jettisoned and the firing plunger 8 relieved of the restraint of the cam-like projections 41 before the sear 26 is withdrawn. Consequently, if the emergency which caused the airman to jettison his canopy 33 is adequately dealt with without it being necessary for the airman to eject himself from the aircraft, the airman need not withdraw the sear 26. Similarly if for any reason the canopy is accidentally jettisoned the firing plunger 8 will still be restrained from movement and the seat will not be accidentally jettisoned. On the other hand, if the airman withdraws the sar 26 before jettisoning the canopy 33, the ejection gun will not be fired until the canopy has been jettisoned and the distance piece 38 withdrawn.

The distance piece 38 is of an axially compressible character and, in the example shown, comprises a tubular body 42 closed at its outer end by a ball ended part 43 seating in a conical recess 44 in the transom 36, and an inner sleeve 45 closed at its outer end by a ball ended part 46 seating in a conical recess 47 in the transom 37, the inner and outer relatively telescoping parts of the distance piece being strongly urged apart by a compression spring 48 of such strength as to prevent longitudinal axial collapse of the distance piece under the action of the firing plunger on the cams 41 when the sear 26 is removed from the cocked firing plunger 8 before the distance piece 38 is withdrawn by the canopy, the spring 48 not, however, being so strong as to resist the withdrawal of the distance piece 38 from between the transoms 36 and 37 under the action of the jettisoned canopy.

Whilst in the arrangement above described the holding member or distance piece 38 is constructed to prevent the movement together of the relatively displaceable members 34 and 35 to free the plunger, it should be understood that a similar result could be achieved by a holding member which normally prevented the relative separation of two relatively displaceable arms or struts. Thus Figure 6 illustrates an alternative construction in which the cable 39 is connected to a yoke-like member 49 which normally prevents the separation of two relatively movable arms or struts 34' and 35'. The latter are similar in construction to the arms or struts 34 and 35 already described, except that the transoms 36' and 37' are provided with notches or recesses 44', 47' on their outer surfaces as distinct from their inner and adjacent surfaces. Projections 50 on the member 49 normally engage in these recesses to prevent the separation of the arms or struts and thereby maintain the cam-surface 41 in contact with the spindle 24 to hold the firing plunger in its cocked position, but when the canopy is jettisoned the member 49 is withdrawn by the cable 39 and the arm 34' may pivot about the spindle 30, thereby disengaging the cam-surface 41 from the spindle 24 of the firing plunger.

Although the said holding member or distance piece 38 is preferably connected to the canopy by means of a cable (such as the cable 39) it may be connected thereto by other means, e.g. by links and/or levers, particularly in the case of a hinged canopy in one or more parts.

I claim:

1. In an aircraft having a jettisonable exit cover and a seat ejection device including an ejection gun adapted for launching a seat from the aircraft, firing mechanism for said ejection gun comprising a housing; a firing member mounted in said housing and biassed in a firing direction; a firing pin actuable by the said firing member; a first retaining member normally simultaneously engaging said firing member and a first part fixed relatively to said housing to prevent firing movement of the said firing member; a displaceable member carried by a second part fixed relatively to said housing; a second retaining member carried by said displaceable member so as to be movable wtih the latter relatively to said housing and to said firing member between a restraining position and a release position in which said second retaining member is disengaged from said firing member; and holding means coupled to said exit cover and simultaneously engaging said displaceable member and a third part fixed relatively to said housing so as to hold said displaceable member and its second retaining member in their restraining positions until the said cover is jettisoned, whereupon the said holding means is automatically withdrawn permitting said displaceable member and said second retaining member to move into their release positions, said first and second retaining members being independent of one another and operable in any order.

2. An apparatus as recited in claim 1 in which said holding means comprises a releasable spring-loaded member normally holding said second retaining member in plunger-retaining position.

3. An apparatus as recited in claim 1 in which said second retaining member comprises a cam surface carried by said displaceable member.

4. An apparatus as recited in claim 1 in which said displaceable member consists of a movable arm pivotably mounted on said housing.

5. In an aircraft having a jettisonable cockpit, a seat positioned below said canopy and an ejection gun adapted for ejecting said seat, the combination of a firing mechanism for said ejection gun comprising a housing, a firing plunger mounted in said housing, a spring biasing said plunger in a firing direction, a firing pin carried by said plunger, a first plunger-retaining means comprising a slidable member positioned on said housing and contacting a part of said plunger to prevent its movement by said spring, a second plunger-retaining means comprising a pair of jaws, one of said jaws rigidly mounted on said housing, the other jaw being pivoted on said housing and carrying a cam surface contacting a part of said plunger to prevent its movement by said spring, releasable means positioned to maintain said jaws in plunger-retaining position and means connecting said releasable means to said canopy so that jettisoning of said canopy withdraws said releasable means, each of said plunger-retaining means being independent of each other and operable in any order.

6. An apparatus as recited in claim 5, in which said first plunger retaining means comprises a sear slidably positioned on said housing and contacting part of said plunger to prevent its movement by said spring.

7. An apparatus as recited in claim 5 in which said plunger comprises a lateral projection having a curved surface contacting the cam surface of said movable jaw.

8. An apparatus as recited in claim 5 in which said releasable member comprises a spring-loaded telescoping member positioned between the said jaws to hold them apart whereby said cam surface is in plunger-retaining position.

9. An apparatus as recited in claim 5 in which said releasable member comprises means to hold said jaws together whereby said cam surface is positioned in plunger retaining position.

10. An apparatus as recited in claim 5 in which the housing contains a time delay mechanism arranged and positioned to retard the movement of said plunger when it has been released by both of said plunger-retaining means.

References Cited in the file of this patent
UNITED STATES PATENTS

| | | |
|---|---|---|
| 2,726,055 | Musser | Dec. 6, 1955 |
| 2,736,236 | Martin | Feb. 28, 1956 |